Patented Feb. 3, 1948

2,435,550

UNITED STATES PATENT OFFICE 2,435,550

4,4'-BIS(PYRAZOLONE-1-CARBOXAMIDE AND THIOCARBOXAMIDE) COUPLERS FOR COLOR PHOTOGRAPHY

Abraham Bavley, Binghamton, N. Y., assignor to General Aniline & Film Corporation, New York, N. Y., a corporation of Delaware No Drawing. Application November 8, 1945, Serial No. 627,531

13 Claims. (Cl. 95—6)

1

This invention relates to the production of colored photographic images by color development, and more particularly to substituted and unsubstituted bis-pyrazolone-1-carboxamides and thiocarboxamides as color-forming couplers therefor.

It is known that compounds containing methylene groups whose hydrogens are activated by other substituents in the molecule, such as carbonyl (CO) or nitrile (CN), readily combine directly with arylnitroso compounds or indirectly with primary aromatic amines in the presence of an oxidizing agent, i. e., with the intermediate oxidation products of said amines to form azomethine dyes. For example, 1-phenyl-3-methyl-5-pyrazolone reacts with p-nitroso-dimethylaniline to form the azomethine dye, 1-phenyl-5-keto-4-dimethylaminophenylimino-3-methyl pyrazolone. Alternatively, the same dye results from the reaction of the above mentioned pyrazolone with p-aminodimethylaniline in the presence of an oxidizing agent such as, for example, potassium persulfate.

The ability of these so-called coupling compounds to react with primary aromatic amines in the presence of oxidizing agents forms the basis of color development in photographic subtractive color processes, in which the primary amino developing agent becomes oxidized locally with the formation of the silver image and the resulting oxidation product immediately reacts with the coupling compound to form an azomethine dye image in situ with the developed silver image.

Pyrazolones which have an active methylene group have been suggested for use in the color-forming development method for the production of the magenta dyestuff image. These compounds may be typified by the following formula:

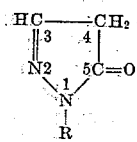

It will be readily apparent that in these compounds the active group is in the 4-position and hence coupling to produce dyes takes place at this point.

2

Bisymmetric pyrazolones which are linked together by a substituted or unsubstituted methylene group or a polymethylene group have already been proposed as color couplers. Compounds of this category are illustrated, for example, in United States Patents 2,213,986 and 2,294,909. From a reference to these patents it will be noted that the two pyrazolone nuclei are linked together through the 4- or active positions of the pyrazolone rings. When these couplers are reacted with the oxidation products of a primary amino color developer they form azomethine dyes. Such dye formation takes place as the result of a fission of the linkage between the two pyrazolone nuclei whereby one and only one nucleus having a reactive methylene group is released for reaction with the oxidation products of the primary aromatic amino developer. The other nucleus which results from such fission is inert so far as coupling and dye formation is concerned since the carbon atom in 4-position thereof is substituted by the original linking chain and such substituted carbon atom is no longer capable of coupling. Due to the fact that only one nucleus enters into the color coupling reaction, the dye images do not possess the intensity and brilliance to be expected from the utilization of a color former originally possessing two pyrazolone nuclei.

I have discovered that substituted and unsubstituted bis-pyrazolone-1-carboxamides and -thiocarboxamides are especially valuable color formers which couple with the oxidation product of an aromatic primary amino developer to form a magenta dye image. Such carboxamides and thiocarboxamides are bonded together in the 4-position of each nucleus and when reacted with the oxidation products of a color developer they form azomethine dyes. Here again the dyes are formed by fission of the bis-pyrazolone. But unlike the bis-pyrazolones of the prior art, my compounds upon fission release two pyrazolone nuclei each containing a reactive methylene group. Both nuclei accordingly enter into the color coupling reaction whereby the dyestuff images formed possess an intensity and brilliance much greater than that realized with the bis-pyrazolones heretofore proposed for use.

It is an object of the present invention to provide a class of color-formers for producing magenta dye images of high intensity and brilliance by color-forming development.

A further object is to provide photographic developer solutions and emulsions which contain a class of color-formers for producing magenta dye images of high intensity and brilliance.

A still further object is to provide finished photographs which contain stable dye images of high intensity and brilliance.

The above and other objects are accomplished according to the present invention by the use as color couplers of substituted and unsubstituted bis-pyrazolone-1-carboxamides and thiocarboxamides of the general formula:

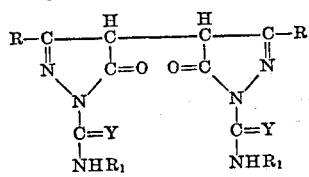

wherein R represents hydrogen or an aliphatic radical such as alkyl, e. g., methyl, ethyl, propyl, butyl, octyl, decyl, heptadecyl, octadecyl, stearyl, or any other alkyl radical containing up to 24 carbon atoms, and alkyl radicals substituted as indicated below, aromatic such as aryl, e. g., phenyl, naphthyl, anthranyl, diphenyl, etc., and aryl substituted as indicated below, or aralkyl, e. g., benzyl, methylbenzyl, ethylbenzyl, o-, m-, or p-tolyl and the like, $R_1$ represents either hydrogen, aliphatic, aromatic or aralkyl of the same value as R, and Y represents either oxygen or sulfur. Said alkyl, aryl and aralkyl radicals given as values for R and $R_1$ may be substituted by halogen, such as chlorine, bromine or iodine, acylamido, i. e., acetamido, propionamido, benzoylamido, etc., imino, nitro, alkoxy, e. g., methoxy, ethoxy, propoxy, butoxy, etc., amino, e. g., primary amino, secondary amino such as methylamino, phenylamino and the like, or tertiary amino such as dimethylamino, diphenylamino, etc., sulfamino, or solubilizing groups such as sulfonic or carboxylic acid groups.

Compounds representing this general classification are as follows:

(1)

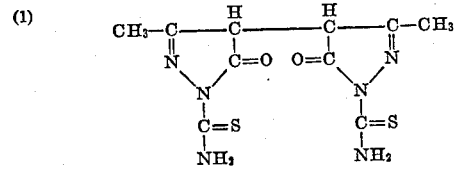

4,4'-bis-(3-methyl pyrazolone-1-thiocarboxamide)

(2)

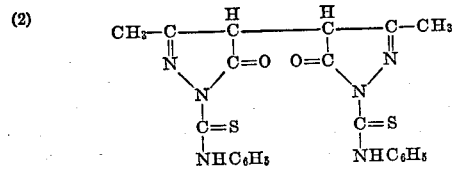

4-4'-bis-(3-methyl pyrazolone-1-thiocarboxphenylamide)

(3)

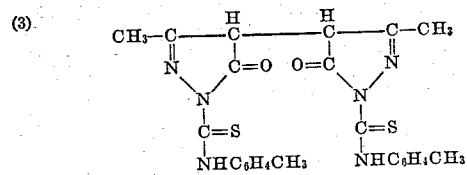

4-4'-bis-(3-methyl pyrazolone-1-thiocarbox-p-tolylamide)

(4)

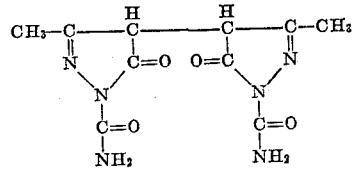

4,4'-bis-(3-methyl pyrazolone-1-carboxamide)

(5)

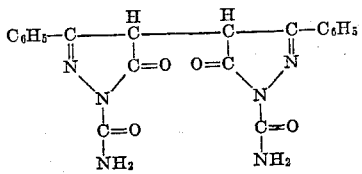

4,4'-bis-(3-phenyl pyrazolone-1-carboxamide)

(6)

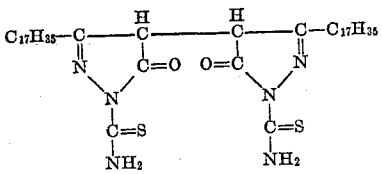

4,4'-bis-(3-heptadecyl pyrazolone-1-thiocarboxamide)

(7)

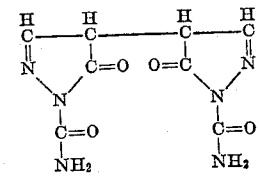

4,4'-bis-(pyrazolone-1-carboxamide)

(8)

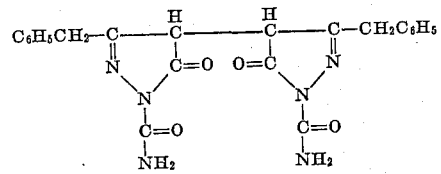

4,4'-bis-(3-benzyl pyrazolone-1-carboxamide)

(9)

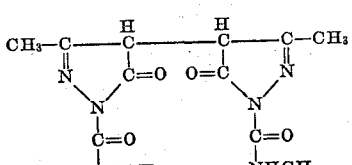

4,4'-bis-(3-methyl pyrazolone-1-methylcarboxamide)

(10)

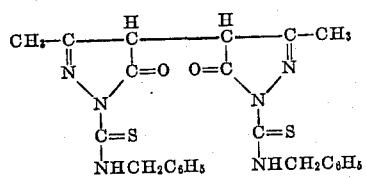

4-4'-bis-(3-methyl pyrazolone-1-N-benzyl thiocarboxamide)

In general, the coupling compounds of the present invention which do not contain solubilizing groups, are water insoluble. Their solubility in water, however, is accomplished by the introduction of suitable solubilizing groups, e. g., sulfonic or carboxylic acid groups into the groups represented by R in the above general formula.

The coupling compounds of the present invention are prepared according to the method of De and Dutt, Jour. Ind. Chem. Soc., 5, 459, 1928, by condensing one mol, of an α, β diacylated succinic acid ester such as, for example, α, β-diacetylsuccinic acid ester, α, β-dibenzoyl succinic acid ester, α, β-distearylsuccinic acid ester, α, β-di-(phenylacetyl) succinic acid ester and the like, with two mols of a substituted or unsubstituted semicarbazide or thiosemicarbazide such as, for example, methylsemicarbazide, phenylsemicarbazide, benzylsemicarbazide, and the like, or methylthiosemicarbazide, phenylthiosemicarbazide, benzylthiosemicarbazide and the like.

The examples of the substituted and unsubstituted bis-pyrazolone-1-carboxamides and thiocarboxamides described herein are exemplary only, it being understood that they may contain other substituent groups, as well as those included in the above general formula.

During the experimentation with the practicing of this invention, I have discovered that the nature of R and $R_1$ substituents in the above general formula is immaterial since any $\alpha,\beta$-diacylated succinic acid ester will condense with any substituted or unsubstituted semicarbazide or thiosemicarbazide, to give the corresponding bi-symmetrical product, and such product will function as a color-former.

The color-formers may be used in the developer, but in this case they should not be fast to diffusion in gelatin. They may also be added to the emulsion and in this event it is preferred that they be fast to diffusion. Whether added to the developer or emulsion, they are used in the form of a solution or a suspension in a suitable solvent, such as, 1N-alcoholic sodium or potassium hydroxide, acetone, ethyl alcohol, isopropyl alcohol, etc. Dispersing agents such as isopropylnaphthalene sulfonic acid or any of the dispersing agents disclosed in United States Patent 2,186,717 may be used in preparing the suspension of the water insoluble color-formers for incorporation into developers or silver-halide emulsions. Instead of gelatin, the color-formers may be incorporated in other colloidal materials such as, organic esters of cellulose, super-polyamides, polyesters or synthetic resins. The emulsion may be carried by a transparent medium such as, cellulose esters, super-polyamides, synthetic resins or a non-transparent reflecting medium such as paper or an opaque cellulose ester. The emulsion may be coated as a single layer on the support, or superposed layers containing the couplers may be coated on one or both sides of the support. The superposed layers are differentially sensitized for the formation of color images in the well-known manner. When incorporating the color-formers into photographic silver-halide emulsions, it is essential that the substituents of R in the above general formula be such that they will prevent the color-formers from migrating from one layer to another, otherwise color distortion will result upon color-forming development. Several methods have been proposed to prevent migration of color-formers from silver-halide emulsion layers by rendering such color-formers "fast to diffusion in gelatin." This result may be accomplished in several ways, as for example, by substituting the 1 and/or 3 positions of the pyrazolone nucleus with suitable groups which impart substantive characteristics to the color-formers which combine permanently with the gelatin and other colloidal materials of the silver-halide emulsion, or by enlarging the substituent group of the color-former with a long chain alkyl radical so that the color-former is incapable of diffusing from the gelatin or other coloidal material. Examples of such methods which render color-formers fast to diffusion are disclosed in United States Patents 2,179,228; 2,179,238-9; 2,179,234; 2,178,612; 2,179,244; 2,186,719; 2,186,851-2; 2,186,732-3-4; 2,186,849; 2,186,045; 2,200,306; 2,280,722; 2,292,575; 2,303,928 and 2,307,399. By reference to these patents, it will be noted that the color-formers are modified by the inclusion of radicals of resins, polypeptides, hydrogenated ring systems, carbohydrates, long alkyl chains, and by having the substituent radical recur a number of times in the final molecule. It is to be understood that the substituent groups of the color-formers of the present invention, in addition to or in lieu of those previously mentioned, may include any of the suggested groups for the purpose of rendering the bis-pyrazolones fast to diffusion.

As examples of suitable aromatic primary amino developing agents which may be employed with the color coupling compounds of the present invention, there may be mentioned p-phenylene diamine, mono ethyl-p-phenylene diamine, o-aminodiethylaniline, 4,4'-diamino-diphenylamine, p-amino dialkyl anilines, e. g., p-aminodimethyaniline and p-aminodiethyl aniline. These developing agents are preferably used in the form of their salts such as the hydrochloride, since the salts are more soluble and stable than the free base. Such amines are characterized by the presence of a free or primary amino group in the phenyl nucleus which enables the oxidation product of the developer to couple with the color-former to form a dye image in the emulsion adjacent to the individual particles of the silver image. The silver image may be removed by bleaching in the well-known manner to leave the color image in the emulsion.

A suitable developing solution is prepared as follows:

| | | |
|---|---|---|
| p-Aminodiethylaniline HCl | grams | 2.0 |
| Sodium carbonate (anhydrous) | do | 50.0 |
| Sodium sulfite (anhydrous) | do | 2.0 |
| Potassium bromide | do | 0.2 |
| Water to make | liters | 1 |

The exposed silver-halide emulsions are developed in the above solution in the usual manner. A solution or suspension of the color-former is added to the developing solution where the color-former is not present in the silver-halide emulsion.

Many specific objects, features and advantages of my invention will become apparent to those skilled in the art from the specific examples appearing below. The following examples are not to be considered as limiting my invention, but are merely illustrative of methods of carrying it out.

EXAMPLE I

*4,4'-bis-(3-methyl pyrazolone-1-thiocarboxamide)*

This compound was prepared according to the method of De and Dutt, by dissolving one mol of $\alpha,\beta$-diacetylsuccinic acid ester in ethanol, and adding the solution thus obtained to an aqueous solution containing two mols of thiosemicarbazide in the form of its hydrochloride. The mixture was vigorously agitated on a shaking machine for several hours. To the resulting mixture one mol of sodium acetate was added and the mixture allowed to stand two days. The solid crystalline product was washed with water and finally recrystallized from ethanol.

1 gram of the above product was dissolved in 20 cc. of ethyl alcohol. 2 cc. of the solution were then added to the developing solution and used for the development of an exposed silver-halide emulsion. A magenta dyestuff image of high intensity and brilliance was obtained together with the silver image.

EXAMPLE II

*4,4'-bis-(3-methyl pyrazolone-1-carboxamide)*

This compound was prepared according to the method of De and Dutt, by condensing one mol of α,β-diacetylsuccinic acid ester with two mols of semicarbazide.

1 gram of the above product was dissolved in 20 cc. of ethyl alcohol. 2 cc. of the solution were then added to the developing solution and used for the development of an exposed silver-halide emulsion. A magenta image similar to that of Example I was obtained together with the silver image.

EXAMPLE III

*4,4'-bis-(3-heptadecyl pyrazolone-1-thiocarboxamide)*

This compound was prepared according to the method of De and Dutt, by condensing one mol of α,β-distearylsuccinic acid ester with two mols of thiosemicarbazide.

1.8 grams of the resulting product was dissolved in 2 cc. of water and the solution added to 100 cc. of gelatin silver bromide-iodide emulsion. The emulsion was coated onto a cellulose acetate base and after drying, the film was exposed and developed. A dye image of excellent magenta color was formed in the emulsion.

While I have disclosed the preferred embodiments of my invention and the preferred modes of carrying the same into effect, it will be readily apparent to those skilled in the art that many variations may be made therein without departing from the spirit thereof. Accordingly, the scope of my invention is to be limited solely by the following claims.

I claim:

1. A color-forming photographic developer comprising an aromatic primary amino developing agent and a coupler compound having the general formula:

$$\begin{array}{c} R-C\overset{H}{\underset{\|}{-}}C\overset{H}{-}C-R \\ N\quad C=O\quad O=C\quad N \\ | \qquad \qquad | \\ N \qquad\qquad\qquad N \\ | \qquad\qquad\qquad | \\ C=Y \qquad\qquad C=Y \\ | \qquad\qquad\qquad | \\ NHR_1 \qquad\qquad NHR_1 \end{array}$$

in which R and $R_1$ are selected from the class consisting of hydrogen, aliphatic, aromatic and aralkyl radicals, and Y is a member selected from the class consisting of oxygen and sulfur.

2. A color-forming photographic developer comprising an aromatic primary amino developing agent and 4,4'-bis-(3-methyl pyrazolone-1-thiocarboxamide).

3. A color-forming photographic developer comprising an aromatic primary amino developing agent and 4,4'-bis-(3-methyl pyrazolone-1-carboxamide).

4. A color-forming photographic developer comprising an aromatic primary amino developing agent and 4,4'-bis-(3-heptadecyl pyrazolone-1-thiocarboxamide).

5. The method of producing a magenta color photographic image in a gelatino silver-halide emulsion layer which comprises exposing the layer and developing it with a solution of an aromatic primary amino developing agent in the presence of a coupler compound having the general formula:

$$\begin{array}{c} R-C\overset{H}{\underset{\|}{-}}C\overset{H}{-}C-R \\ N\quad C=O\quad O=C\quad N \\ | \qquad \qquad | \\ N \qquad\qquad\qquad N \\ | \qquad\qquad\qquad | \\ C=Y \qquad\qquad C=Y \\ | \qquad\qquad\qquad | \\ NHR_1 \qquad\qquad NHR_1 \end{array}$$

in which R and $R_1$ are selected from the class consisting of hydrogen, aliphatic, aromatic and aralkyl radicals, and Y is a member selected from the class consisting of oxygen and sulfur.

6. The method of producing a magenta color photographic image in a gelatino silver-halide emulsion layer which comprises exposing the layer and developing it with a solution of an aromatic primary amino developing agent in the presence of 4,4'-bis-(3-methyl pyrazolone-1-thiocarboxamide).

7. The method of producing a magenta color photographic image in a gelatino silver-halide emulsion layer which comprises exposing the layer and developing it with a solution of an aromatic primary amino developing agent in the presence of 4,4'-bis-(3-methyl pyrazolone-1-carboxamide).

8. The method of producing a magenta color photographic image in a gelatino silver-halide emulsion layer which comprises exposing the layer and developing it with a solution of an aromatic primary amino developing agent in the presence of 4,4'-bis-(3-heptadecyl pyrazolone-1-thiocarboxamide).

9. A photographic silver-halide emulsion containing a coupler compound having the formula:

$$\begin{array}{c} R-C\overset{H}{\underset{\|}{-}}C\overset{H}{-}C-R \\ N\quad C=O\quad O=C\quad N \\ | \qquad \qquad | \\ N \qquad\qquad\qquad N \\ | \qquad\qquad\qquad | \\ C=Y \qquad\qquad C=Y \\ | \qquad\qquad\qquad | \\ NHR_1 \qquad\qquad NHR_1 \end{array}$$

in which R and $R_1$ are selected from the class consisting of hydrogen, aliphatic, aromatic and aralkyl radicals, and Y is a member selected from the class consisting of oxygen and sulfur.

10. A photographic silver-halide emulsion according to claim 9 wherein at least one substituent represented by R and $R_1$ is a long chain aliphatic radical.

11. A photographic silver-halide emulsion for forming color images comprising a colloidal carrier containing a sensitive silver-halide and 4,4'-bis-(3-methyl pyrazolone-1-thiocarboxamide).

12. A photographic silver-halide emulsion for forming color images comprising a colloidal carrier containing a sensitive silver-halide and 4,4'-bis-(3-methyl pyrazolone-1-carboxamide).

13. A photographic silver-halide emulsion for forming color images comprising a colloidal carrier containing a sensitive silver-halide and 4,4'-bis-(3-heptadecyl pyrazolone-1-thiocarboxamide).

ABRAHAM BAVLEY.

REFERENCES CITED

The following references are of record in the file of this patent:

UNITED STATES PATENTS

| Number | Name | Date |
|---|---|---|
| 2,387,145 | Gluck | Oct. 16, 1945 |

OTHER REFERENCES

De et al., "Indian Chemical Society," vol. 5 (1928), page 459. (Copy in the Dept. of Agriculture Library and Photostat in 95–6 C.)